No. 882,126. PATENTED MAR. 17, 1908.
C. O. RYDBERG.
FREE WHEEL HUB FOR BICYCLES.
APPLICATION FILED NOV. 12, 1907.

Witnesses
W. C. Healy
J. J. Sheehy

Inventor
Carl O. Rydberg.
By James J. Sheehy
Atty.

UNITED STATES PATENT OFFICE.

CARL OSKAR RYDBERG, OF GÖTEBORG, SWEDEN.

FREE-WHEEL HUB FOR BICYCLES.

No. 882,126.  Specification of Letters Patent.  Patented March 17, 1908.

Application filed November 12, 1907. Serial No. 401,788.

*To all whom it may concern:*

Be it known that I, CARL OSKAR RYDBERG, residing at Göteborg, Sweden, have invented new and useful Improvements in Free-Wheel Hubs for Bicycles, of which the following is a specification.

Figure 1:
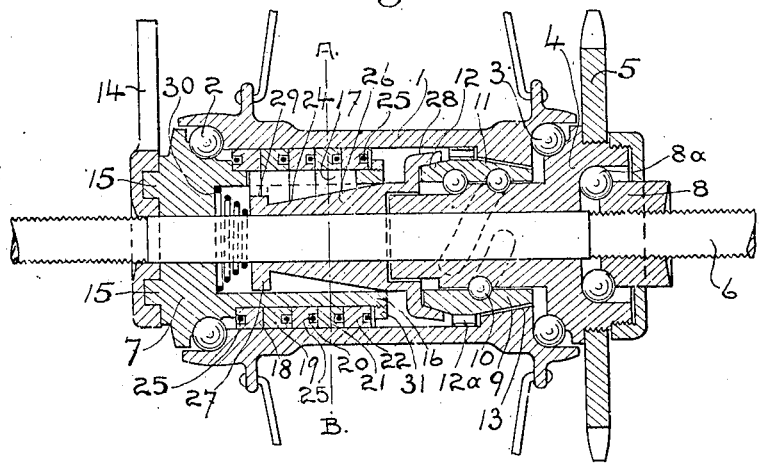
Figure 2:
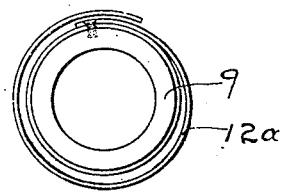
Figure 3:
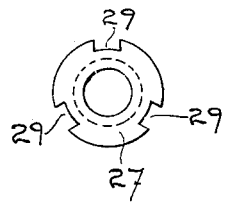
Figure 4:
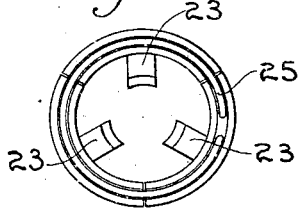
Figure 5:
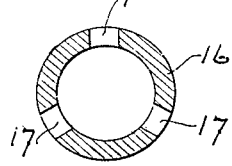

My invention pertains to free wheel hubs for bicycles; and its novelty, utility and practical advantages will be fully understood from the following description and claims when the same are read in connection with the drawings, accompanying and forming part of this specification, in which:

Figure 1 is a sectional view of a hub illustrating the best practical embodiment of my invention known to me. Figs. 2, 3 and 4, are detail views hereinafter referred to. Fig. 5 is a detail section of the endwise movable sleeve 16, taken in the plane indicated by the line A—B of Fig. 1.

Similar numerals designate corresponding parts in all of the views of the drawings.

The inside of the hub body 1 is cylindrical, and said body has at its ends anti-friction balls 2, 3, through which it rotates on the one side against a cone 4, which carries the chain wheel 5, and on the opposite side against a cone 7 on the axle 6, which axle is fixed to the frame of the bicycle. The chain wheel 5, which, as usual, is actuated from the pedals through chain gearing, can together with its cone be turned round the axle 6. During the propulsion of the pedals the hub body revolves on the fixed bearing 8 with its balls 8ª. The cone 4 is partly surrounded by a sleeve 9, arranged to be moved towards the cone 4 by means of a thread-shaped ball bearing 10, arranged between the cone and sleeve. The outer side of the sleeve 9 is coned towards both ends thereof, as indicated by 11 and 12, with a cylindrical between zone, which is surrounded by a spring 12ª, Figs. 1 and 2, which is slightly pressed against the interior surface of the hub body 1 in order that the friction between the spring and the hub body may prevent the cone 4, when rotating, carrying the sleeve 9 with it.

The one conical end 11 of the sleeve 9 fits into a conical surface 13 inside of the hub body 1 with which it can be brought into contact when wanted. The cone 7 is connected with the bicycle frame through an arm 14, which receives projections 15 of the said cone to prevent same from turning. The inner end of the cone 7 is extended to form a cylinder 16, having longitudinal slots 17, Figs. 1 and 5, arranged at regular intervals, which slots do not reach to the ends of the cylinder. A number of rings (five on the drawing) is placed round the cylinder 16, which rings 18, 19, 20, 21, 22 are of the same size and rectangular in cross-section and are divided each one into as many segments as there are slots 17. Each of these segments is in its center provided with a heel 23, Fig. 4, directed radially towards the center and fitting into one of the slots 17. The surface of said heels, which faces inward, is sloped, Fig. 1, so that when the rings are placed side by side with each heel in its proper slot 17, their sloped surfaces form together an inclined plane or a wedge 24, which fills up the slot 17.

In a circular channel in one side of each ring is placed a spring 25, which tends to draw the different segments of the ring towards the center. The wedges 24 formed by the heels 23 engage with an exteriorly-tapered sleeve 26 movable endwise on the axle 6. The smaller end of said tapered sleeve faces towards the cone 7, and is furnished with a flange 27, while the opposite end is provided with a flange 28 the interior surface of which is coned and fitted to the cone 12 of the sleeve 9, with which it can be engaged when required. The flange 27 is provided, Fig. 3, with slots for the wedges 24, near the flange 27. The slots 29 do not reach quite down to the coned surface of the sleeve 26, and consequently heels 23 are provided with hooks which rest on the cylinder 16. The heels thus prevent the sleeve 26 from revolving on the shaft. A spiral spring 30 between the bottom of the cylinder 16 and the flange 27 keeps the sleeve 26 away from the fixed cone 7, so that the segments of the rings 18—22 are drawn together towards the center by their springs 25, and their pressure against the inner surface of the hub body 1 is reduced to nothing. The different rings 18—22 are kept close to each other by a stop-nut 31 at the end of the cylinder 16, which stop-nut also prevents the spring 25 of the innermost ring from falling out of its channel.

The working of my improved hub is as follows: When the chain wheel 5 rotates in a forward direction the sleeve 9 by means of the thread-shaped ball-bearing 10 screws itself outward until its cone 11 engages with the cone 13 of the hub body 1, and the friction so produced forces the wheel to advance. If the pedals are being stopped when the bicycle is still running on, the wheel tends to bring the sleeve 9 to revolve on account of the engagement between the two cones, but then the sleeve 9 screws itself inward whereby the cones are disengaged and the wheel continues to rotate freely on the balls 2 and 3. If then the pedals with the chain wheel are propelled in the opposite direction, the sleeve 9 by reason of the thread-shaped ball-bearing moves laterally against the sleeve 26 so that its coned surface 12 becomes pressed into the cone 28, and, if this motion is continued, forces the sleeve 26 against the cone 7. The conical surface of the sleeve 26 then actuates the wedges 24 so that the segments of the rings 18-22 are pressed outward against the surface of the hub body and produce such a strong friction against the said body that the wheel is braked. There are no stiff parts that keep the sleeve 9 when shifted from moving to stopping, but this is done by the mere friction partly at the cone 13 and partly at the spring 12$^a$, in consequence whereof a soft and dangerless converting of the driving into stop takes place if the bicycle is suddenly braked. The thread-shaped ball-bearing 10 diminishes the dead resistance to the lowest possible degree and the arrangement of the brakes 18-22 makes the braking powerful and quite safe.

Having described my invention, what I claim and desire to secure by Letters-Patent, is:

1. In a bicycle, the combination with a driving-wheel hub body, and wheel propelling means arranged inside the hub body and controlled by the rider; of a fixed, longitudinally slotted cylinder disposed in the hub body, a ring surrounding said cylinder and divided into as many segments as there are slots in the cylinder and having on each segment a heel disposed in one of the slots and terminating in a sloped end which forms a wedge, a tapered sleeve movable endwise in the cylinder and engaged with the ends of the heels, a sleeve movable endwise in the hub body and having a cone at one end to engage said body and arranged when moved in one direction to engage the hub body and when moved in the opposite direction to push the tapered sleeve against the tapered ends of the heels on the segments to force the latter outward, and means intermediate the wheel propelling means and the said coned sleeve for shifting the latter.

2. In a bicycle, the combination with a driving-wheel hub body, and wheel propelling means arranged inside the hub body and controlled by the rider; of a device movable radially toward and from the hub body and held against turning with the hub body and having an inwardly extending heel terminating in a beveled end, an exteriorly tapered, endwise movable sleeve engaging said beveled end, a second endwise movable sleeve having a cone to engage the hub body and arranged to be shifted in one direction to engage the hub body and also arranged to be shifted in the opposite direction to push the tapered sleeve against the tapered or beveled end of the heel on the radially movable device, means intermediate the wheel propelling means and the said coned sleeve for shifting the latter, and a spring connected at one end to and surrounding the coned sleeve and interposed between the same and the hub body.

3. The combination of a wheel hub, a longitudinally slotted cylinder fixed therein, a ring surrounding the cylinder and having in one side a channel, the said ring being divided into segments and the segments being provided with projecting heels disposed in the slots of the cylinder and terminating in beveled ends, an exteriorly tapered sleeve for engaging said beveled ends, means for shifting said sleeve, and a spring disposed in the channel of the ring.

4. In a bicycle, the combination of a driving-wheel hub body, a fixed cone disposed in one end of the body and having a lateral extension forming a slotted cylinder, segments interposed between said cylinder and the hub body and having heels disposed in the slots of the cylinder and terminating in beveled ends, an endwise movable tapered sleeve engaging said beveled ends, a rotary cone disposed in the opposite end of the hub body, a sleeve surrounding the latter cone and arranged when shifted in one direction to frictionally engage the hub body and when shifted in the opposite direction to push the first mentioned sleeve against the beveled ends of the segment heels, and a thread-shaped ball bearing interposed between the rotary cone and the second mentioned sleeve.

In testimony whereof I have hereunto set my hand in presence of two subscribing witnesses.

CARL OSKAR RYDBERG.

Witnesses:
ERIC WIDHOLM,
GOTTFO LINDSKOG.